US006655705B2

(12) United States Patent
Turgeon

(10) Patent No.: US 6,655,705 B2
(45) Date of Patent: Dec. 2, 2003

(54) RUNNING BOARD ASSEMBLY FOR A TRICYCLE AND A METHOD OF ATTACHING THE SAME

(75) Inventor: Romain Joseph Alphonse Turgeon, Morinville (CA)

(73) Assignee: Lehman Trikes Inc., Westlock (CA)

( * ) Notice: Subject to any disclaimer, the term of this patent is extended or adjusted under 35 U.S.C. 154(b) by 0 days.

(21) Appl. No.: 10/011,845

(22) Filed: Dec. 4, 2001

(65) Prior Publication Data
US 2002/0070527 A1 Jun. 13, 2002

(30) Foreign Application Priority Data
Dec. 7, 2000 (CA) .............................................. 2327834

(51) Int. Cl.[7] ................................................. B60R 3/00
(52) U.S. Cl. ........................ 280/163; 280/291; 180/210
(58) Field of Search ................................. 280/291, 293, 280/163; 180/210, 215, 216, 217

(56) References Cited

U.S. PATENT DOCUMENTS

| 1,261,442 A | * | 4/1918 | Sturt ........................... 280/291 |
| 1,629,320 A | * | 5/1927 | Rigby ........................ 180/291 |
| 4,401,315 A | * | 8/1983 | Pavincic ..................... 280/259 |
| 4,787,470 A | * | 11/1988 | Badsey ........................ 180/210 |
| 6,116,630 A | * | 9/2000 | Thomas ..................... 280/291 |

* cited by examiner

Primary Examiner—Kevin Hurley
(74) Attorney, Agent, or Firm—Davis & Bujold, P.L.L.C.

(57) ABSTRACT

A running board assembly and a method of attaching the same to a tricycle includes a pair of running boards. Each of the running boards has a front end and a rear end. The rear end of each of the running boards is attached to a fender. A cross brace is provided which is adapted to underlie and be secured to a frame of the tricycle. The cross brace has opposed ends. The running boards are secured to and supported by the opposed ends of the cross brace.

20 Claims, 5 Drawing Sheets

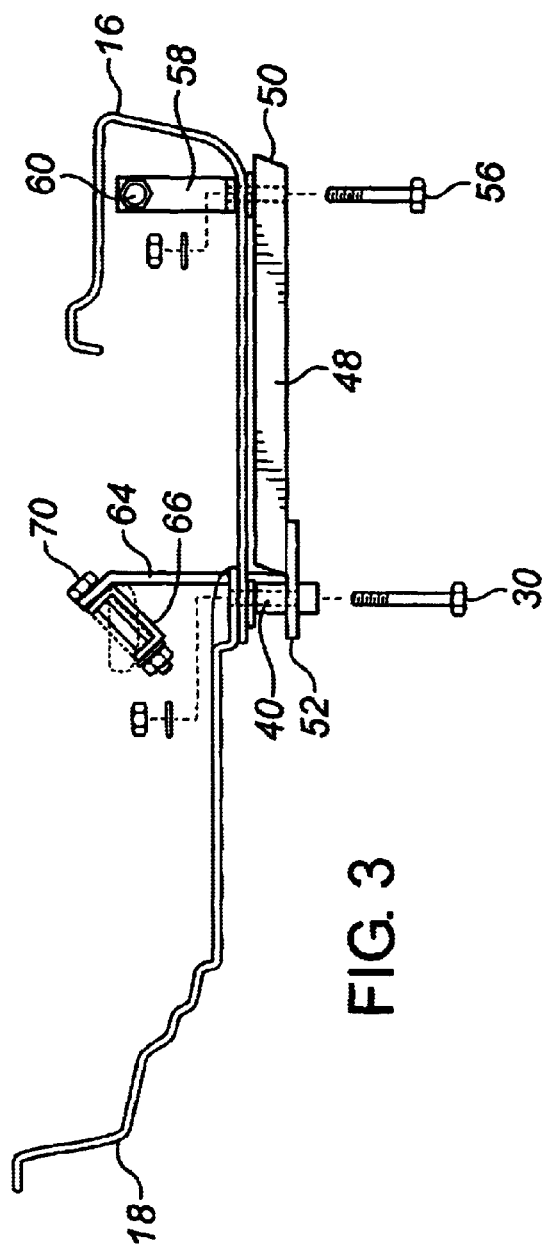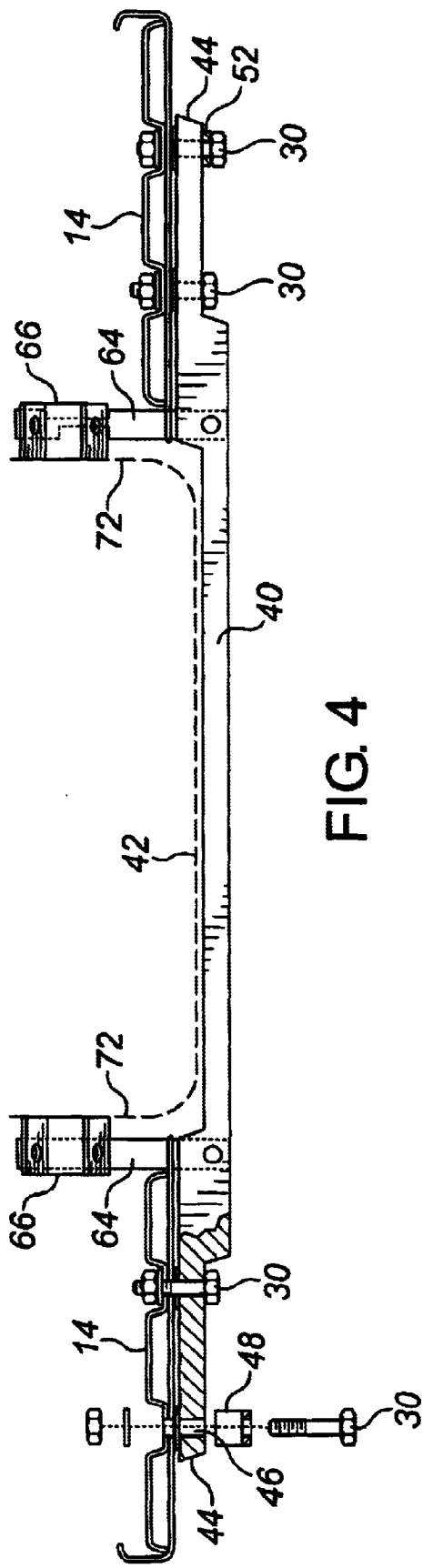

RUNNING BOARD ASSEMBLY FOR A TRICYCLE AND A METHOD OF ATTACHING THE SAME

FIELD OF THE INVENTION

The present invention relates to a running board assembly for a tricycle and a method of attaching the same to a tricycle.

BACKGROUND OF THE INVENTION

Running boards are commonly installed on vehicles, such as cars and trucks, by attaching support brackets to the frame of the vehicle. Running boards are not in common usage on motorcycles or tricycles. If one were to endeavour to attach running boards to a tricycle, one would find that the attachment brackets used for other vehicles are not suited for use on tricycles.

SUMMARY OF THE INVENTION

What is required is a running board assembly for a tricycle and a method of attaching the same to a tricycle.

According to one aspect of the present invention there is provided a running board assembly for a tricycle which includes a pair of running boards. Each of the running boards has a front end and a rear end. Means is provided for mounting the rear end of each of the running boards to a fender. A cross brace is provided which is adapted to underlie and be secured to a frame of a tricycle. The cross brace has opposed ends. Means is provided for securing one of the pair of running boards to each of the opposed ends of the cross brace.

According to another aspect of the present invention there is provided a method of attaching the above described running boards to a tricycle. A first step involves providing a tricycle having a frame with opposed sides, a superstructure and rear fenders. A second step involves providing a running board assembly for a tricycle as described above. A third step involves securing the cross brace in a position underlying the tricycle frame with the opposed ends of the cross brace in running board supporting position protruding past the opposed sides of the tricycle frame. A fourth step involves securing the running boards to the cross brace toward the front end of the running boards. A fifth step involves securing the rear end of each of the running boards to one of the rear fenders of the tricycle on each of the opposed sides of the tricycle frame.

When the running board assembly and method of installing the same, described above, enable tricycles to be equipped with running boards. As will hereinafter be further described, there are further features or enhancements that can be added to the running board assembly and method of attachment.

Although beneficial results may be obtained through the use of the running board assembly and method of installing the same, described above, the running boards will function better if additional support is added to the front end of the running boards. Even more beneficial results may, therefore, be obtained when the front end of the running boards is further supported with front braces that attach to the tricycle frame. Alternatively, or in addition, even more beneficial results may be obtained when the front end of the running boards is further supported by securing the front end of the running boards to the tricycle superstructure.

Although beneficial results may be obtained through the use of the running board assembly and method of attaching the same, described above, a tricycle has foot rests that the running board assembly will cover. Even more beneficial results may, therefore, be obtained when foot rest mounting brackets are secured to the cross brace.

Although beneficial results may be obtained through the use of the running board assembly and method of attaching the same, described above, it has been found that attachment to the cross brace is simplified and when each of the running boards having a front section and a rear section which are detachably secured to each other and to the cross brace.

According to a further aspect of the present invention there is provided a tricycle and running board combination. The tricycle has a frame with opposed sides, a superstructure and rear fenders. A pair of running boards are provided having a front end and a rear end. The rear end of each of the running boards is secured to one of the rear fenders on each of the opposed sides of the frame. A cross brace having opposed ends underlies the tricycle frame with the opposed ends of the cross brace in a supporting position protruding past the opposed sides of the tricycle frame. The running boards are secured to the cross brace toward the front end of the running boards.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 3 is a partially exploded side elevation view, in section of the tricycle with running boards illustrated in FIG. 2.

FIG. 4 is a partially exploded rear elevation view, in section of the tricycle with running boards illustrated in FIG. 2.

DETAILED DESCRIPTION OF THE PREFERRED EMBODIMENT

Figure 1:
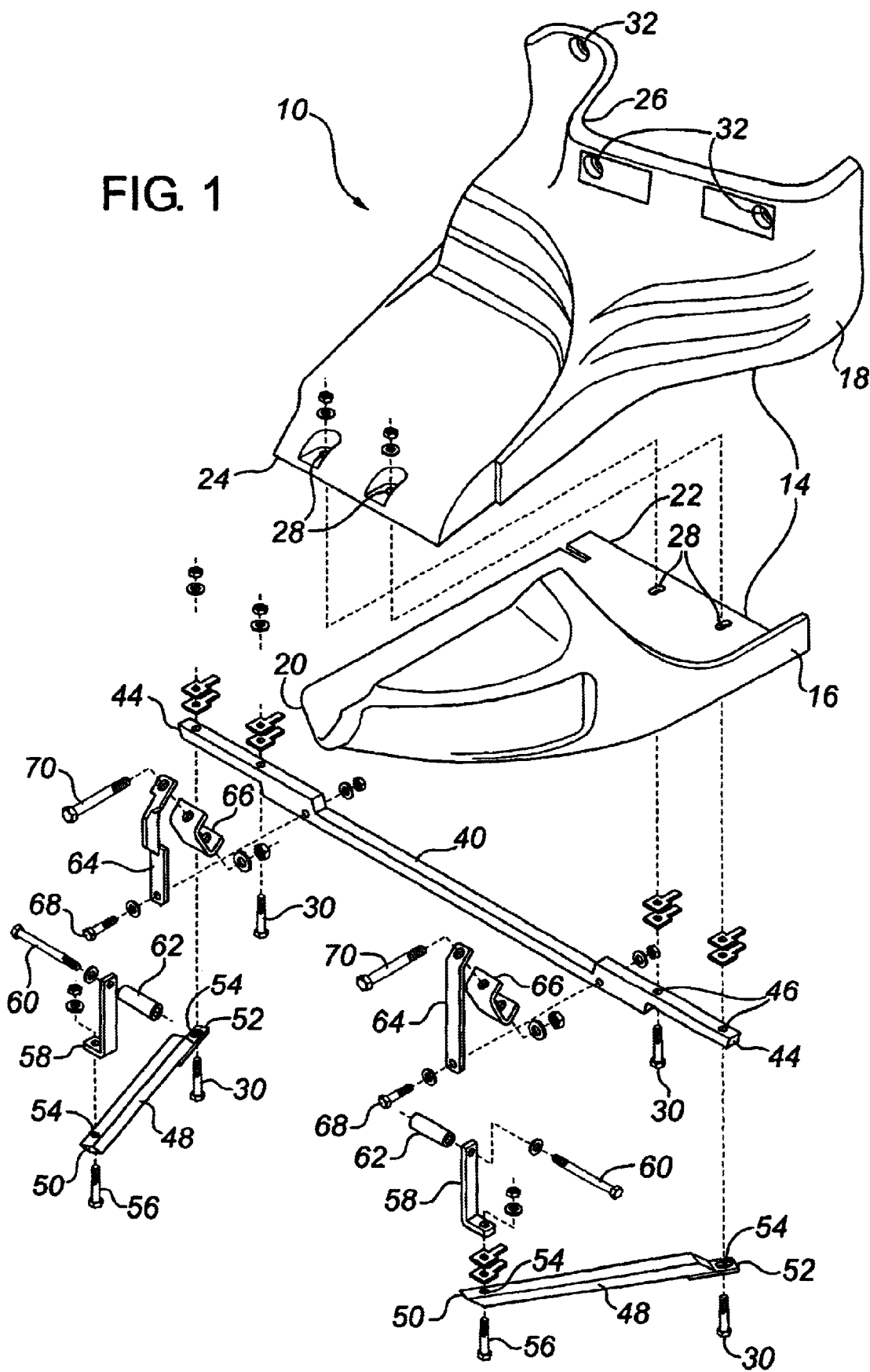
FIG. 1 is an exploded perspective view of a running board assembly for a tricycle fabricated in accordance with the teachings of the present invention.

The preferred embodiment, a running board assembly generally identified by reference numeral 10, will now be described with reference to FIGS. 1 through 6.

Figure 2:
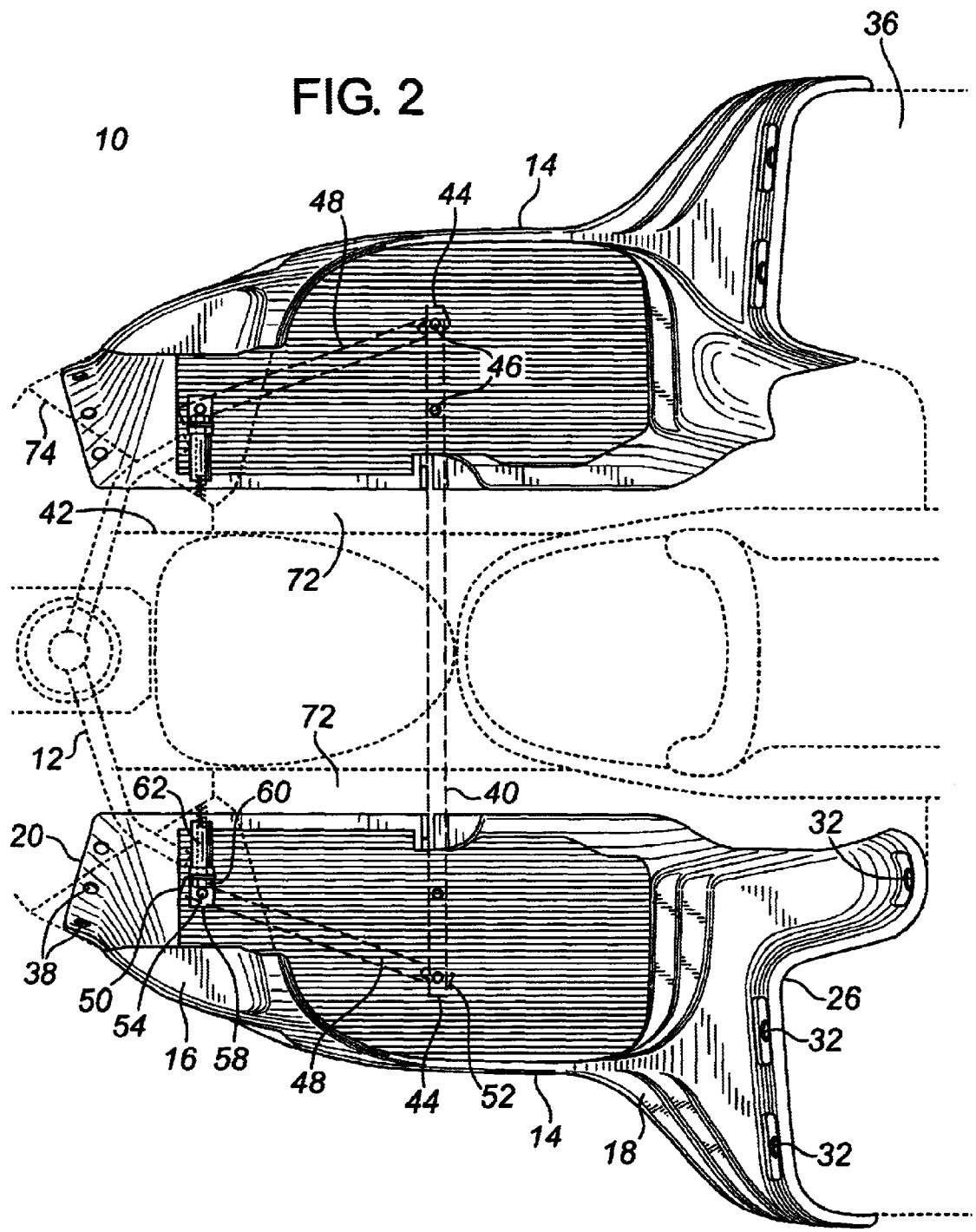
FIG. 2 is a top plan view of the running board assembly illustrated in FIG. 1, mounted on a tricycle.

Structure and Relationship of Parts:

Referring to FIG. 2, there is provided a running board assembly 10 for a tricycle 12 that includes a pair of running boards 14. Referring to FIG. 1, each of the running boards 14 has a front section 16 and a rear section 18 which are detachably secured together. Front section 16 has a first end 20 and a second end 22. Rear section 18 has a first end 24 and a second end 26. Second end 22 of front section 16 and first end 24 of rear section 18 have fastener receiving openings 28, whereby front section 16 and rear section 18 are secured together by fasteners 30. Referring to FIG. 2, second end 26 of rear section 18 of each of running boards 14 also has fastener receiving openings 32, whereby second end 26 of rear section 18 is secured to a fender 36. Referring to FIG. 2, front end 20 of front section 16 has fastener receiving openings 38 whereby front end 20 of front section 16 can be secured to tricycle 12.

Referring to FIG. 4, a cross brace 40 is provided that is adapted to underlie and be secured to a frame 42 of tricycle 12. Cross brace 40 has opposed ends 44 with fastener receiving openings 46, whereby fasteners 30 that secure front section 16 and rear section 18 together also secure running boards 14 to cross brace 40.

Referring to FIG. 1, a pair of front braces 48 are provided. Each of front braces 48 have a first end 50 and a second end 52 with fastener receiving openings 54, whereby fasteners 56 extend through fastener receiving openings 54 at first end 50 to secure front section 16 of running boards 14 to front braces 48. Fasteners 30 extend through fastener receiving openings 54 at second end 52 to secure second end 52 of front section 16 to one of opposed ends 44 of cross brace 40.

Figure 5:
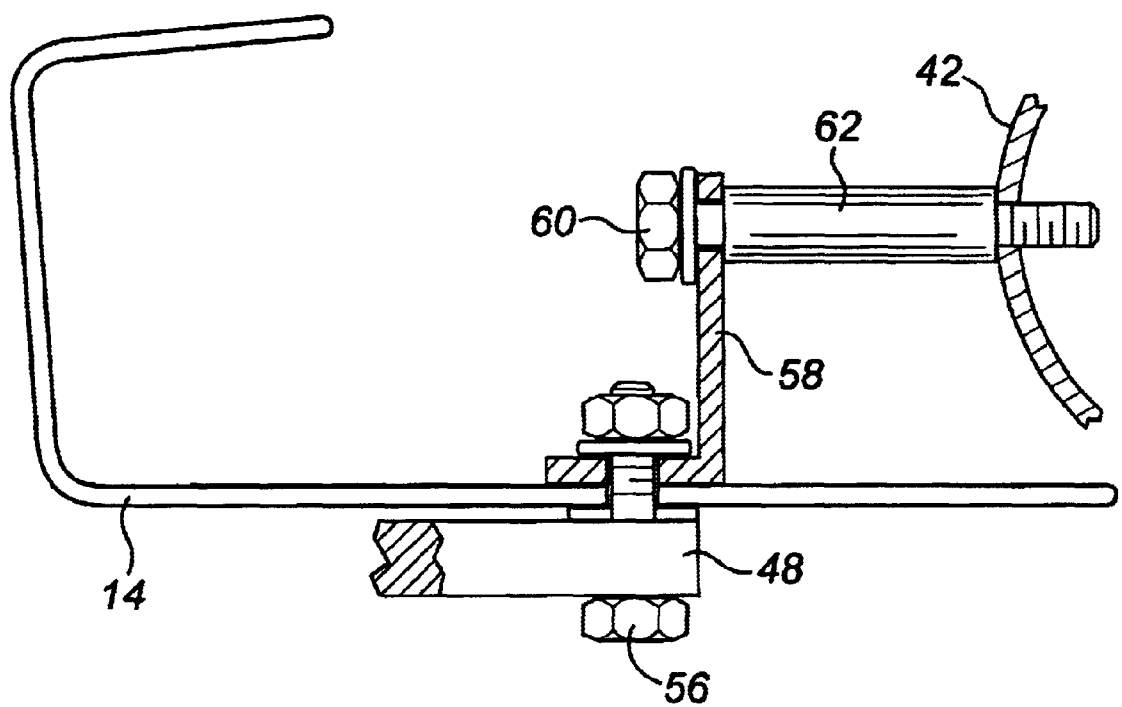
FIG. 5 is a front elevation view, in section, of the tricycle with running boards illustrated in FIG. 2.

Referring to FIG. 5, a front mounting bracket 58 is adapted to secure first end 50 of each front brace 48 to frame 42 of tricycle 12. Front mounting bracket 58 is secured to frame 42 by means of a fastener 60 inserted through a spacer sleeve 62 that is interposed between frame 42 and front mounting bracket 58. Referring to FIGS. 1 and 3, foot rest mounting brackets 64 with a c-shaped member 66 are secured to cross brace 40 by fasteners 68. C-shaped member 66 is secured to foot rest mounting bracket 64 by means of a fastener 70.

Figure 6:
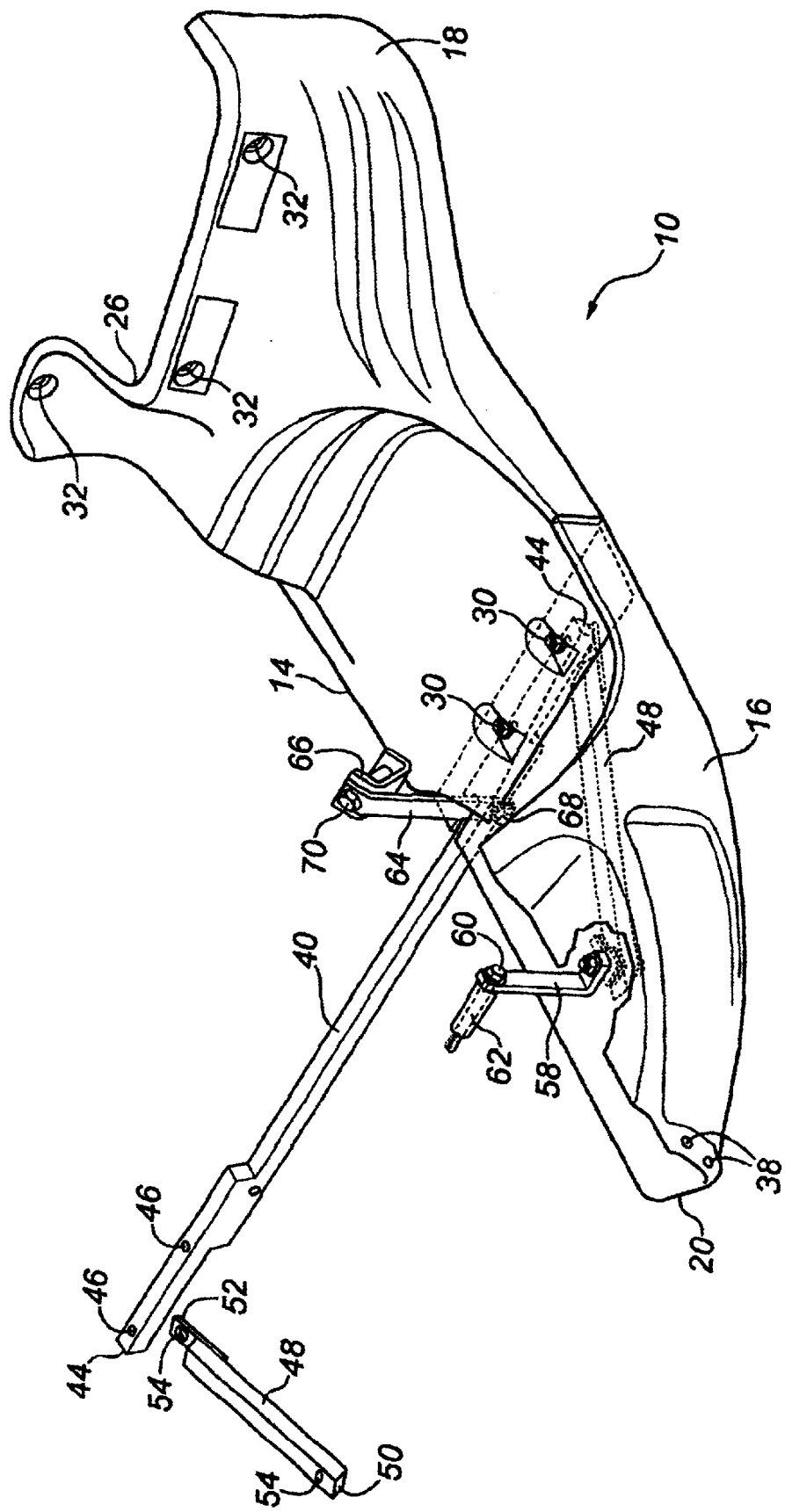
FIG. 6 is a perspective view of the running board assembly illustrated in FIG. 1.

Operation:

Referring to FIGS. 1 though 6, there is illustrated a method of attaching running boards 14 to tricycle 12. Referring to FIG. 2, a first step involves providing tricycle 12 that has frame 42 with opposed sides 72, a superstructure 74 and rear fenders 36. Referring to FIG. 1, a second step involves providing running board assembly 10 for tricycle 12 as described above. Referring to FIG. 4, a third step involves securing cross brace 40 in a position underlying frame 42 of tricycle 12 with opposed ends 44 of cross brace 40 in running board supporting position protruding past opposed sides 72 of frame 42 of tricycle 12. Referring to FIG. 6, a fourth step involves securing front braces 48 to frame 42 of tricycle 12 and securing front end 20 of front section 16 of running boards 14 to front braces 48. Running boards 14 are secured to cross brace 40 in an intermediate position between front end 20 and rear end 26 of running boards 14. Referring to FIG. 2, a fifth step involves securing second end 26 of rear section 18 of each of running boards 14 to one of rear fenders 36 of tricycle 12 on each of opposed sides 72 of frame 42 of tricycle 12. Front end 20 of running boards 14 is secured to tricycle superstructure 74.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A running board assembly for a tricycle, comprising:
   a pair of running boards, each of the running boards having a front end and a rear end, the rear end being raised;
   means for mounting the rear end of each of the running boards to a fender at a first elevation;
   at least one cross brace adapted to be secured to a frame of a tricycle, the at least one cross brace having opposed ends; and
   means for securing running boards to one of the opposed ends of the at least one cross brace at a second elevation.

2. The running board assembly as defined in claim 1, wherein each of the opposed ends of the at least one cross brace has fastener receiving openings.

3. A tricycle, comprising in combination:
   a frame with opposed sides, a superstructure and rear fenders;
   a pair of running boards having a front end and a rear end, the rear end being raised, the rear end of each of the running boards being secured to one of the rear fenders at a first elevation on each of the opposed sides of the frame;
   a cross brace having opposed ends underlying the tricycle frame with the opposed ends of the cross brace in a supporting position protruding past the opposed sides of the tricycle frame, the running boards being secured to the cross brace at a second elevation toward the front end of the running boards;
   the front end of the running boards being attached to the frame with front braces; and
   the front end of the running boards being secured to the superstructure.

4. A running board assembly for a tricycle, comprising:
   A pair of running boards, each of the running boards having a front end and a rear end;
   means for mounting the rear end of each of the running boards to a fender;
   at least one cross brace adapted to be secured to a frame of a tricycle, the at least one cross brace having opposed ends; and
   means for securing running boards to one of the opposed ends of the at least one cross brace;
   front braces with means being provided to secure the front braces to the frame of the tricycle, and means being provided for securing the front end of the running boards to the front braces; and
   each of the front braces has a first end and a second end, the second end being securable to one of the opposed ends of the cross brace, a front mounting bracket being provided as means for securing the front brace to the frame of the tricycle.

5. The running board assembly as defined in claim 4, wherein foot rest mounting brackets are provided which are securable to the cross brace.

6. The running board assembly as defined in claim 4, wherein each of the running boards has a front section and a rear section which are detachably secured together.

7. The running board assembly as defined in claim 6, wherein the front section has a first end and a second end, the rear section has a first end and a second end, the second end of the front section and the first end of the rear section having fastener receiving openings, whereby the front section and rear section are secured by fasteners to each other and to the at least one cross brace.

8. The running board assembly as defined in claim 4, wherein the rear end of each of the running boards has fastener receiving openings, whereby the rear end of each of the running boards is secured by fasteners to a fender.

9. A running board assembly for a tricycle, comprising:

a pair of running boards, each of the running boards has a front section and a rear section which are detachably secured together, the front section having a first end and a second end, the rear section having a first end and a second end, the second end of the front section and the first end of the rear section having fastener receiving openings, whereby the front section and rear section are secured together by fasteners, the second end of the rear section of each of the running boards has fastener receiving openings, whereby the second end of the rear section is secured by fasteners to a fender;

a cross brace adapted to underlie and be secured to a frame of a tricycle, the cross brace having opposed ends with fastener receiving openings, whereby the fasteners securing the front section and rear section together also secure the running boards to the cross brace;

a pair of front braces, each of the front braces having a first end and a second end with fastener receiving openings, whereby fasteners are extended through the fastener receiving openings at the first end to secure the front end of the running boards to the front braces and fasteners are extended through the fastener receiving openings at the second end to secure the second end to one of the opposed ends of the cross brace;

a front mounting bracket adapted to secure the first end of the front brace to the frame of the tricycle; and foot rest mounting brackets securable to the cross brace.

10. A method of attaching running boards to a tricycle, comprising the steps of:

providing a tricycle having a frame with opposed sides, a superstructure and rear fenders;

providing a running board assembly for a tricycle, including:

a pair of running boards, each of the running boards having a front end and a rear end;

a cross brace having opposed ends;

securing the cross brace in a position underlying the tricycle frame with the opposed ends of the cross brace in running board supporting position protruding past the opposed sides of the tricycle frame;

securing the running boards to the cross brace toward the front end of the running boards; and securing the rear end of each of the running boards to one of the rear fenders of the tricycle on each of the opposed sides of the tricycle frame.

11. The method as defined in claim 10, including the further step of further supporting the front end of the running boards with front braces that attach to the tricycle frame.

12. The method as defined in claim 10, including the further step of further supporting the front end of the running boards by securing the front end of the running boards to the tricycle superstructure.

13. The method as defined in claim 10, including the further step of securing foot rest mounting brackets to the cross brace.

14. The method as defined in claim 10, each of the running boards having a front section and a rear section which are detachably secured together.

15. A method of attaching running boards to a tricycle, comprising the steps of:

providing a tricycle having a frame with opposed sides, a superstructure and rear fenders;

providing a running board assembly for a tricycle, including:

a pair of running boards, each of the running boards having a front end and a rear end;

a cross brace having opposed ends; and front braces;

securing the cross brace in a position underlying the tricycle frame with the opposed ends of the cross brace in running board supporting position protruding past the opposed sides of the tricycle frame;

securing front braces to the tricycle frame;

securing the front end of the running boards to the front braces;

securing the running boards to the cross brace in an intermediate position between the front end and the rear end of the running boards;

securing the rear end of each of the running boards to one of the rear fenders of the tricycle on each of the opposed sides of the tricycle frame; and securing the front end of the running boards to the tricycle superstructure.

16. A tricycle, comprising in combination:

a frame with opposed sides, a superstructure and rear fenders;

a pair of running boards having a front end and a rear end, the rear end of each of the running boards being secured to one of the rear fenders on each of the opposed sides of the frame;

a cross brace having opposed ends underlying the tricycle frame with the opposed ends of the cross brace in a supporting position protruding past the opposed sides of the tricycle frame, the running boards being secured to the cross brace toward the front end of the running boards.

17. The tricycle as defined in claim 16, the front end of the running boards being attached to the frame-with front braces.

18. The tricycle as defined in claim 16, the front end of the running boards being secured to the superstructure.

19. The method as defined in claim 16, foot rest mounting brackets being secured to the cross brace.

20. The method as defined in claim 16, each of the running boards having a front section and a rear section which are detachably secured together.

* * * * *